United States Patent
Kuga

(10) Patent No.: US 10,180,355 B2
(45) Date of Patent: Jan. 15, 2019

(54) CONFOCAL MEASUREMENT DEVICE

(71) Applicant: Keyence Corporation, Osaka (JP)

(72) Inventor: Shoma Kuga, Osaka (JP)

(73) Assignee: Keyence Corporation, Osaka (JP)

( * ) Notice: Subject to any disclaimer, the term of this patent is extended or adjusted under 35 U.S.C. 154(b) by 23 days.

(21) Appl. No.: 15/375,190

(22) Filed: Dec. 12, 2016

(65) Prior Publication Data

US 2017/0122808 A1    May 4, 2017

Related U.S. Application Data

(63) Continuation of application No. PCT/JP2015/067968, filed on Jun. 23, 2015.

(30) Foreign Application Priority Data

Jun. 27, 2014  (JP) .................. 2014-133342

(51) Int. Cl.
   *G01N 21/00*    (2006.01)
   *G01J 3/45*    (2006.01)
   (Continued)

(52) U.S. Cl.
   CPC ............. *G01J 3/45* (2013.01); *G01B 11/00* (2013.01); *G01B 11/06* (2013.01); *G01D 5/266* (2013.01);
   (Continued)

(58) Field of Classification Search
   CPC ........ G01B 11/00; G01B 11/06; G01D 5/266; G01J 3/0218; G01J 3/45; G01J 3/46; G01J 3/52
   (Continued)

(56) References Cited

U.S. PATENT DOCUMENTS

| 4,585,349 A | 4/1986 | Gross et al. |
| 9,068,822 B2 * | 6/2015 | Sesko .................. G01B 11/007 |

(Continued)

FOREIGN PATENT DOCUMENTS

| CN | 1556914 A | 12/2004 |
| CN | 1975487 A | 6/2007 |

(Continued)

OTHER PUBLICATIONS

International Search Report issued in corresponding International Patent Application No. PCT/JP2015/067968 dated Sep. 29, 2015 with English translation (5 pages).

*Primary Examiner* — Sunghee Y Gray
(74) *Attorney, Agent, or Firm* — Kilyk & Bowersox, P.L.L.C.

(57) ABSTRACT

Provided are a multi-wavelength photoelectric measurement device, a confocal measurement device, an interference measurement device, and a color measurement device capable of measuring the characteristic amount of a measurement object such as the thickness, distance, displacement, or color with high accuracy using multi-wavelength light such as white light. The multi-wavelength photoelectric measurement device includes a laser light source, a light source optical member for concentrating light from the laser light source, a phosphor excited by light concentrated by the light source optical member, an optical fiber unit that includes one or a plurality of optical fibers and the phosphor disposed on a first end, receives light emitted by the phosphor from the first end, and transmits the received light toward a second end, and a head optical member that concentrates light emitted from the second end of the optical fiber unit toward a measurement object.

11 Claims, 18 Drawing Sheets

(51) Int. Cl.
  *G01J 3/46*    (2006.01)
  *G01B 11/00*   (2006.01)
  *G01B 11/06*   (2006.01)
  *G01D 5/26*    (2006.01)
  *G01J 3/52*    (2006.01)
  *G01J 3/02*    (2006.01)

(52) U.S. Cl.
  CPC .............. *G01J 3/0218* (2013.01); *G01J 3/46* (2013.01); *G01J 3/52* (2013.01)

(58) Field of Classification Search
  USPC ........................................................ 356/72
  See application file for complete search history.

(56) References Cited

U.S. PATENT DOCUMENTS

| | | |
|---|---|---|
| 2004/0246493 A1 | 12/2004 | Kim et al. |
| 2007/0121684 A1 | 5/2007 | Yamazaki et al. |
| 2010/0172148 A1 | 7/2010 | Komazaki et al. |
| 2012/0280144 A1* | 11/2012 | Guilfoyle .............. G01J 3/4406 250/458.1 |
| 2016/0241822 A1* | 8/2016 | Takagi ................. H04N 9/3111 |

FOREIGN PATENT DOCUMENTS

| | | |
|---|---|---|
| JP | H02-095222 A | 4/1990 |
| JP | 2005-291748 A | 10/2005 |
| JP | 2010-121977 A | 6/2010 |
| JP | 2010-160948 A | 7/2010 |
| JP | 2012-021856 A | 2/2012 |
| JP | 2013-007986 A | 1/2013 |
| JP | 2013-061675 A | 4/2013 |
| WO | 2010047270 A1 | 4/2010 |

\* cited by examiner

CONFOCAL MEASUREMENT DEVICE

CROSS-REFERENCE TO RELATED APPLICATIONS

The present application is a continuation of International Patent Application No. PCT/JP2015/067968, filed Jun. 23, 2015, which claims foreign priority based on Japanese Patent Application No. 2014-133342, filed Jun. 27, 2014, the contents of which are incorporated herein by reference.

BACKGROUND OF THE INVENTION

1. Field of the Invention

The present invention relates to multi-wavelength photoelectric measurement devices such as a confocal displacement meter, an interference displacement meter, and a color optical sensor capable of measuring the characteristic amount of a measurement object such as the thickness, distance, displacement, or color using multi-wavelength light such as white light.

2. Description of Related Art

A photoelectric measurement device emits visible light or infrared light from a light emitting unit and detects reflected light that has been reflected by the surface of a measurement object or transmitted light that has been transmitted through a measurement object by a light receiving unit. A measurement unit measures the characteristic amount of a measurement object such as the thickness, distance, displacement, or color according to a light intensity distribution of each wavelength in the light receiving unit (refer to U.S. Pat. No. 4,585,349, JP 2012-021856 A, JP 2010-121977 A, and JP 02-095222 A).

In conventional multi-wavelength photoelectric measurement devices, a white light source such as a halogen lamp or a xenon lamp, a white LED, or a super luminescent diode (SLD) is used as a light emitting source.

However, when a super luminescent diode (SLD) is used as a light emitting source, disadvantageously, desired measurement cannot be performed due to an insufficient wavelength width of emitted light depending on the measurement specification.

On the other hand, when a white light source such as a halogen lamp or a xenon lamp, or a white LED is used as a light emitting source, it is difficult to form an image having a small spot diameter due to a larger area of the light emitting unit. When light applied to a measurement object has a large spot diameter, light is also applied to an area other than a desired measurement object area, which may disadvantageously result in inappropriate measurement.

In particular, in a confocal displacement meter or an interference displacement meter, when light applied to a measurement object has a large spot diameter, not only the accuracy in the vertical direction with respect to the optical axis direction, but also the accuracy of measurement in the thickness and the displacement measured along the optical axis direction is deteriorated.

In order to solve such problems, the light emitting source may be provided with a diaphragm to reduce the spot diameter of light applied to a measurement object. However, white light sources such as a halogen lamp and a xenon lamp disadvantageously have a short life. Further, also when a white LED is used, since a white LED has a small light emission amount per unit area, the amount of light applied to a measurement object is small. Thus, disadvantageously, measureable objects are restricted, and the thickness and distance of a measurement object cannot be detected with high accuracy.

SUMMARY OF THE INVENTION

The present invention has been made in view of the above circumstances, and an object thereof is to provide a multi-wavelength photoelectric measurement device, a confocal measurement device, an interference measurement device, and a color measurement device capable of measuring the characteristic amount of a measurement object such as the thickness, distance, displacement, or color with high accuracy using multi-wavelength light such as white light.

In order to achieve the above object, according to one embodiment of the invention, a multi-wavelength photoelectric measurement device includes a laser light source, a light source optical member for concentrating light from the laser light source, a phosphor excited by light concentrated by the light source optical member, an optical fiber unit that includes one or a plurality of optical fibers and the phosphor disposed on a first end, receives light emitted by the phosphor from the first end, and transmits the received light toward a second end, a head optical member that concentrates light emitted from the second end of the optical fiber unit toward a measurement object, a light receiving element that selectively receives light from the measurement object according to wavelength and photoelectrically converts the received light to a signal corresponding to a light receiving amount, and a measurement control unit that measures the characteristic amount of the measurement object on the basis of the signal indicating the light receiving amount corresponding to the wavelength from the light receiving element.

According to another embodiment of the invention, in the multi-wavelength photoelectric measurement device, it is characterized that in the first aspect the phosphor is fixed inside a light transmissive medium that transmits light from the laser light source and light emitted by the phosphor, and the light transmissive medium is fixed to the first end of the optical fiber unit.

According to still another embodiment of the invention, it is characterized that in the first or second aspect the multi-wavelength photoelectric measurement device further includes an optical filter that is disposed between the phosphor and the light source optical member, and transmits light from the laser light source and reflects light emitted by the phosphor.

According to still another embodiment of the invention, it is characterized that in any one of the first to third aspects, the multi-wavelength photoelectric measurement device further includes a frame body that includes an opening having a shape corresponding to an optical path of light incident on the first end of the optical fiber unit and houses the phosphor in the opening.

According to still another embodiment of the invention, it is characterized that in the first aspect the multi-wavelength photoelectric measurement device further includes a frame body that includes an opening having a shape corresponding to an optical path of light incident on the first end of the optical fiber unit and houses the phosphor in the opening, and an optical filter that covers the frame body at a side facing the light source optical member, transmits light from the laser light source, and reflects light emitted by the phosphor.

According to still another embodiment of the invention, it is characterized that in the first aspect the multi-wavelength photoelectric measurement device further includes a frame body that includes an opening having a shape corresponding to an optical path of light incident on the first end of the optical fiber unit and houses the phosphor in the opening, wherein the phosphor is fixed inside a light transmissive medium that transmits light from the laser light source and light emitted by the phosphor, and the phosphor and the light transmissive medium are housed in the opening of the frame body.

According to still another embodiment of the invention, it is characterized that in the first aspect the multi-wavelength photoelectric measurement device further includes a frame body that includes an opening having a shape corresponding to an optical path of light incident on the first end of the optical fiber unit and houses the phosphor in the opening, and an optical filter that covers the frame body at a side facing the light source optical member, transmits light from the laser light source, and reflects light emitted by the phosphor, wherein the phosphor is fixed inside a light transmissive medium that transmits light from the laser light source and light emitted by the phosphor, and the phosphor and the light transmissive medium are housed in the opening of the frame body.

According to still another embodiment of the invention, it is characterized that in any one of the fourth to seventh aspect the multi-wavelength photoelectric measurement device further includes a reflecting surface formed on a wall on an inner-diameter side of the frame body.

According to still another embodiment of the invention, it is characterized that in any one of the first to eighth aspects in the multi-wavelength photoelectric measurement device, the light source optical member includes one or a plurality of lenses.

According to still another embodiment of the invention, it is characterized that in any one of the first to eighth aspects in the multi-wavelength photoelectric measurement device, the light source optical member includes a tubular reflecting mirror with a lens incorporated.

Next, in order to achieve the above object, according to one embodiment of the invention, a multi-wavelength photoelectric measurement device includes a laser light source, a light source optical member for concentrating light from the laser light source, a phosphor excited by light concentrated by the light source optical member, a reflecting member that includes the phosphor disposed on a reflecting surface and reflects light emitted by the phosphor by the reflecting surface, a second light source optical member for concentrating light emitted by the phosphor, an optical fiber unit that includes one or a plurality of optical fibers, receives light concentrated by the second light source optical member from a first end, and transmits the received light toward a second end, a head optical member that concentrates light emitted from the second end of the optical fiber unit toward a measurement object, a light receiving element that selectively receives light from the measurement object according to wavelength and photoelectrically converts the received light to a signal corresponding to a light receiving amount, and a measurement control unit that measures the characteristic amount of the measurement object on the basis of the signal indicating the light receiving amount corresponding to the wavelength from the light receiving element.

Next, in order to achieve the above object, according to one embodiment of the invention, a confocal measurement device includes a laser light source, a light source optical member for concentrating light from the laser light source, a phosphor excited by light concentrated by the light source optical member, an optical fiber unit that includes one or a plurality of optical fibers and the phosphor disposed on a first end, receives light emitted by the phosphor from the first end, and transmits the received light toward a second end, a head optical member that concentrates light emitted from the second end of the optical fiber unit toward a measurement object and allows reflected light from the measurement object to enter the second end of the optical fiber unit, a splitter unit disposed on the optical fiber unit for directing at least part of light incident on the optical fiber from the second end to a second optical path different from a first optical path leading to the first end, a light receiving element that selectively receives light passing through the second optical path from the measurement object according to wavelength using a spectroscope and photoelectrically converts the received light to a signal corresponding to a light receiving amount, and a measurement control unit that measures the thickness or displacement of the measurement object on the basis of the signal indicating the light receiving amount corresponding to the wavelength from the light receiving element.

Next, in order to achieve the above object, according to one embodiment of the invention, an interference measurement device includes a laser light source, a light source optical member for concentrating light from the laser light source, a phosphor excited by light concentrated by the light source optical member, an optical fiber unit that includes one or a plurality of optical fibers and the phosphor disposed on a first end, receives light emitted by the phosphor from the first end, and transmits the received light toward a second end, a head optical member that includes a reference body, concentrates light emitted from the second end of the optical fiber unit toward a measurement object and the reference body, and allows reflected light from the measurement object and the reference body to enter the second end of the optical fiber unit, a splitter unit disposed on the optical fiber unit for directing at least part of light incident on the optical fiber unit from the second end to a second optical path different from a first optical path leading to the first end, a light receiving element that selectively receives light passing through the second optical path from the measurement object according to wavelength using a spectroscope and photoelectrically converts the received light to a signal corresponding to a light receiving amount, and a measurement control unit that measures the thickness or displacement of the measurement object on the basis of the signal indicating the light receiving amount corresponding to the wavelength from the light receiving element.

Next, in order to achieve the above object, according to one embodiment of the invention, a color measurement device includes a laser light source, a light source optical member for concentrating light from the laser light source, a phosphor excited by light concentrated by the light source optical member, an optical fiber unit that includes one or a plurality of optical fibers and the phosphor disposed on a first end, receives light emitted by the phosphor from the first end, and transmits the received light toward a second end, a head optical member that concentrates light emitted from the second end of the optical fiber unit toward a measurement object, a light receiving element that selectively receives light from the measurement object according to wavelength and photoelectrically converts the received light to a signal corresponding to a light receiving amount, and a measurement control unit that measures a color of the measurement object on the basis of the signal indicating the light receiving amount corresponding to the wavelength from the light receiving element and compares the measured color with a preset reference color range.

The present invention makes it possible to allow light emitted from the laser light source to enter the optical fiber unit through the phosphor which is disposed on the first end of the optical fiber unit at the side facing the light source optical member. Thus, even when light is wavelength-converted and diffused by the phosphor, it is possible to reliably concentrate the light to efficiently allow the light to enter the optical fiber unit. Therefore, it is possible to measure the characteristic amount of a measurement object such as the thickness, distance, displacement, or color with high accuracy.

DETAILED DESCRIPTION OF PREFERRED EMBODIMENTS

Hereinbelow, a multi-wavelength photoelectric measurement device according to an embodiment of the present invention will be specifically described on the basis of the drawings.

(Multi-Wavelength Photoelectric Measurement Device)

Figure 1:
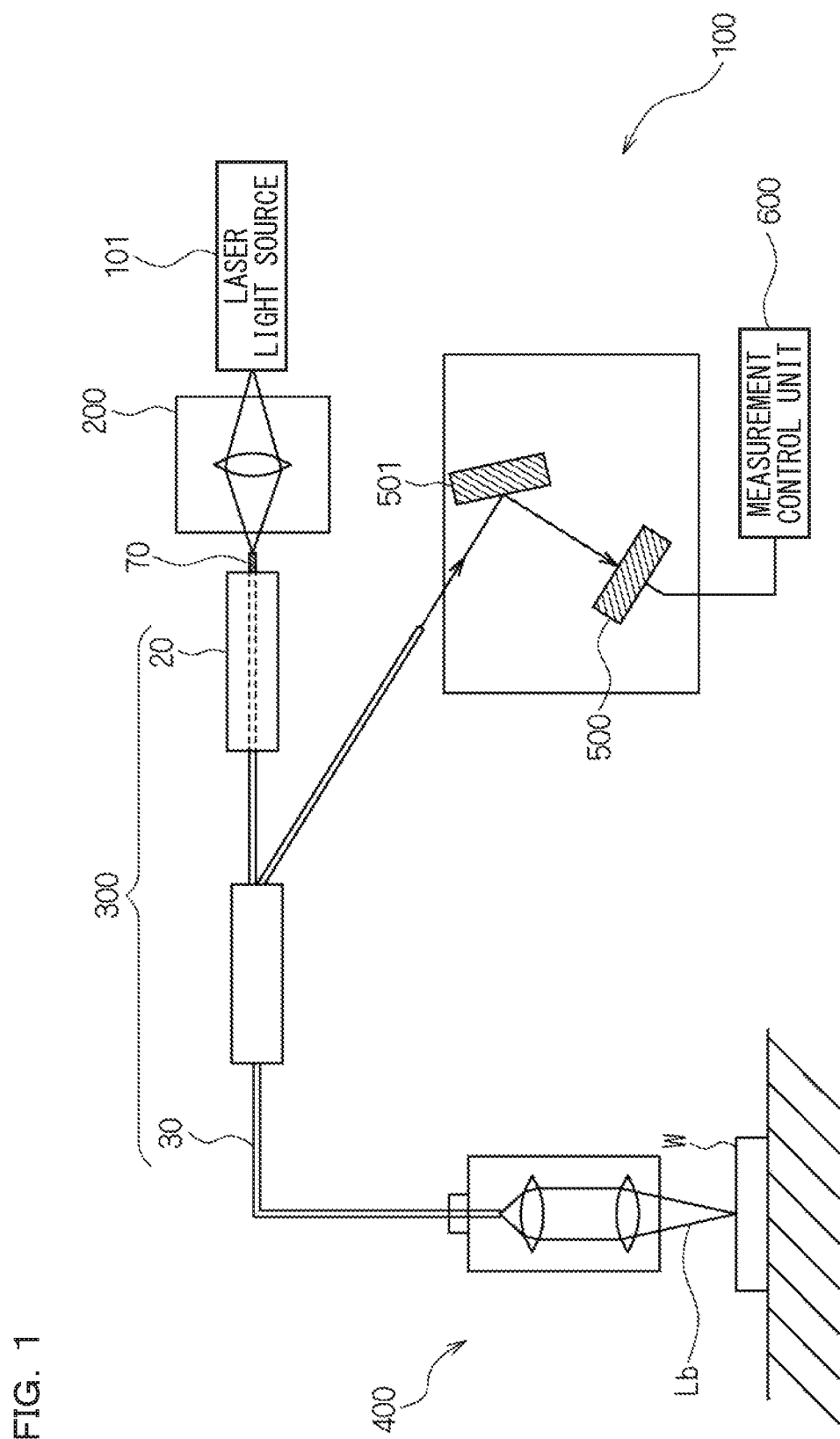
FIG. 1 is a block diagram schematically illustrating a multi-wavelength photoelectric measurement device according to an embodiment of the present invention.

FIG. 1 is a block diagram schematically illustrating a multi-wavelength photoelectric measurement device according to an embodiment of the present invention. The multi-wavelength photoelectric measurement device 100 includes a laser light source 101, a light source optical member 200, a phosphor 70, an optical fiber unit 300, a head optical member 400, a light receiving element 500, and a measurement control unit 600.

The laser light source 101 emits light having a single wavelength and, preferably, emits blue light or ultraviolet light having a wavelength of 450 nm or less. More preferably, when the laser light source 101 emits blue light, light that is a mixture of light that has been used for the excitation of the phosphor 70 and wavelength-converted and light that has not been used for the excitation of the phosphor 70 and remains blue can be applied to a measurement object.

The phosphor 70 is excited by light from the laser light source 101 and emits light converted to a different wavelength. The phosphor 70 includes one or a plurality of kinds of phosphors 70. For example, the phosphor 70 may be excited by blue light and emit converted yellow light. Alternatively, two kinds of phosphors 70 may be excited by blue light and emit converted green light and converted red light.

The phosphor 70 may be fixed inside a light transmissive medium (71 of FIG. 4) such as a resin or glass which transmits light from the laser light source 101 and light emitted by the phosphor 70.

The optical fiber unit 300 includes one or a plurality of optical fibers 30. For easy handling, a ferrule 20 may be used on the end of the optical fiber 30. A core diameter of an exit end of the optical fiber 30 which is an end facing the head optical member 400 is preferably 200 μm or less in diameter and more preferably 50 µm or less in diameter in view of the influence on a spot diameter formed on a measurement object.

In the optical fiber unit 300, the phosphor 70 is fixed to an entrance end of the optical fiber 30 which is an end facing the light source optical member 200. The phosphor 70 may be fixed inside a light transmissive medium 71 such as a resin or glass which transmits light from the laser light source 101 and light emitted by the phosphor 70, and the light transmissive medium 71 may be fixed to the entrance end of the optical fiber 30. In order to allow light from the laser light source 101 and light from the phosphor 70 to efficiently enter the optical fiber 30, the refractive index of the light transmissive medium 71 is equal to or less than the refractive index of an entrance end core of the optical fiber 30.

In order to bring light that is a mixture of light that has been used for the excitation of the phosphor 70 and wavelength-converted and light that has not been used for the excitation of the phosphor 70 and remains blue into a desired state, the thickness in an optical path direction of the phosphor 70 including the light transmissive medium 71 is set to approximately 10 µm to 200 µm, and the concentration of the phosphor 70 in the light transmissive medium 71 is set to approximately 30% to 60%.

When the thickness in the optical path direction of the phosphor 70 or the phosphor 70 including the light transmissive medium 71 is set to approximately 10 µm to 200 µm, preferably, a frame body (80 of FIG. 5) which includes an opening having a shape corresponding to an optical path of light incident on the entrance end of the optical fiber unit 30 is provided, and the phosphor 70 or the phosphor 70 including the light transmissive medium 71 is housed in the opening of the frame body 80.

In order to efficiently excite the phosphor 70 and allow light that is a mixture of light that has been used for the excitation of the phosphor 70 and wavelength-converted and light that has not been used for the excitation of the phosphor 70 and remains blue to efficiently enter the optical fiber unit 300, the inner peripheral wall surface of the frame body 80 may be a reflecting surface (81 of FIG. 6) and/or the frame body 80 may be covered with an optical filter (a reflective filter (90 of FIG. 7) which transmits light from the laser light source 101 and reflects light emitted by the phosphor 70 at the side facing the light source optical member 200.

The light transmissive medium 71 is disposed in an area on which light from the laser light source 101 is concentrated. Thus, a material having a high heat resistance and/or a material having a high heat dissipation is selected as the light transmissive medium 71.

An adhesive resin may be selected as the light transmissive medium 71, and the phosphor 70 may adhere and may be fixed to the entrance end of the optical fiber 30 with the adhesive resin.

The head optical member 400 concentrates light emitted from the exit end of the optical fiber unit 300 toward a measurement object (workpiece) W.

The light receiving element 500 includes a multi-divided photodiode (PD) or an image sensor such as a CCD or CMOS and selectively receives light from the measurement object W according to the wavelength through a spectroscope 501 which includes a diffraction grating or a prism or a color selecting optical filter.

The light receiving element 500 may receive light from the measurement object W through the optical fiber unit 300 or through another optical path.

The measurement control unit 600 measures the characteristic amount of the measurement object W such as the thickness, distance, displacement, or color on the basis of a signal indicating the light receiving amount according to the wavelength from the light receiving element 500.

When the head optical member 400 is configured to have a confocal position at the exit end of the optical fiber unit 300, light from the measurement object W is separated according to the wavelength by the spectroscope 501 which includes a diffraction grating or a prism, and a wavelength-luminance distribution of light from the measurement object W is detected according to the light receiving position in the light receiving element 500. For example, when a chromatic aberration lens is used as the head optical member 400, the measurement control unit 600 evaluates that the measurement object W is present in a nearer distance when light having a shorter wavelength is detected and the measurement object W is present in a farther distance when light having a longer wavelength is detected to measure the thickness and the distance of the measurement object W. When a diffractive lens is used as the head optical member 400, the measurement control unit 600 evaluates that the measurement object W is present in a farther distance when light having a shorter wavelength is detected and the measurement object W is present in a nearer distance when light having a longer wavelength is detected to measure the thickness and the distance of the measurement object W.

First Embodiment

Figure 2:
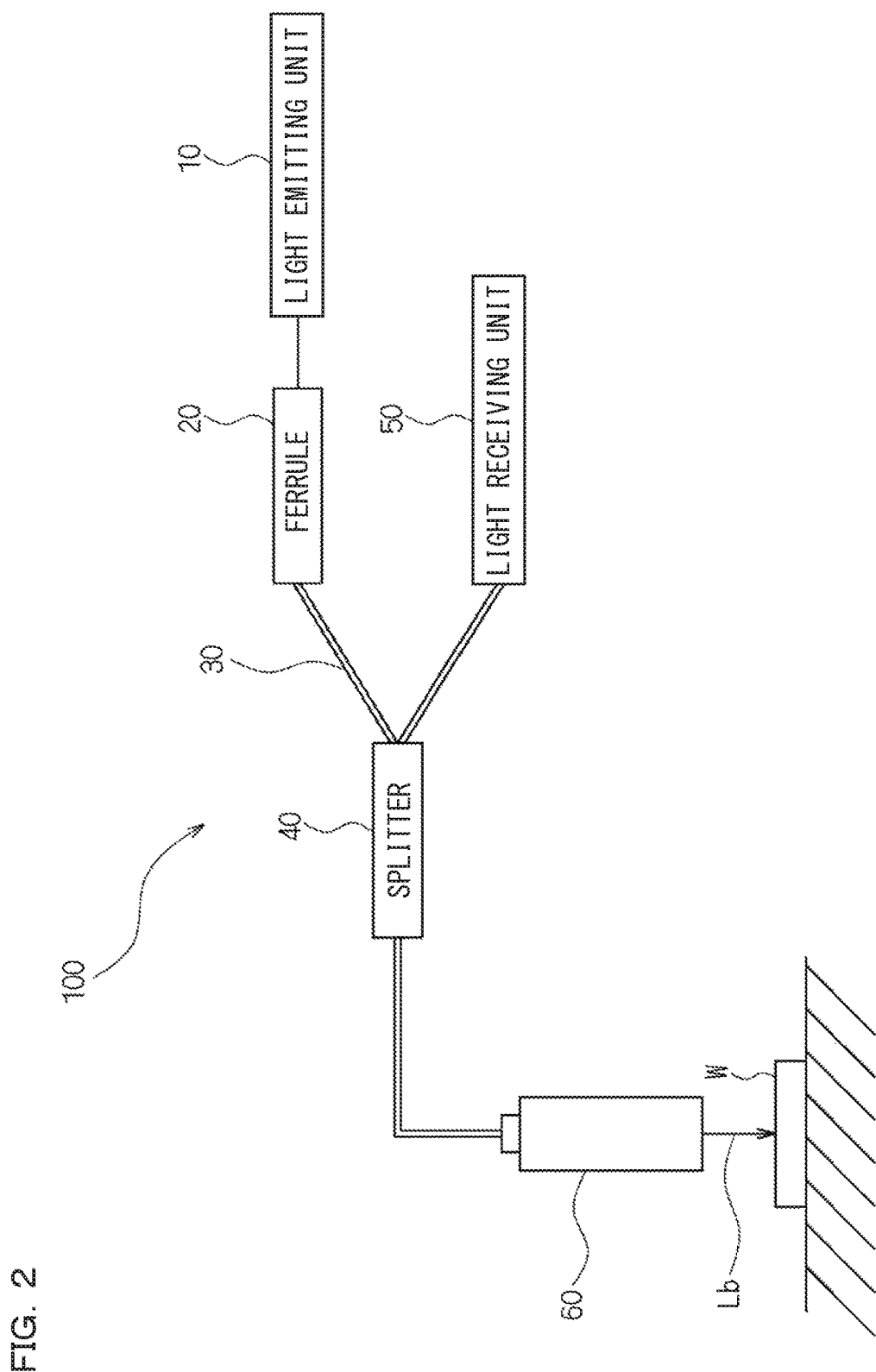
FIG. 2 is a block diagram schematically illustrating the configuration of a confocal measurement device which is a multi-wavelength photoelectric measurement device according to a first embodiment of the present invention.

FIG. 2 is a block diagram schematically illustrating the configuration of a confocal measurement device which is a multi-wavelength photoelectric measurement device according to a first embodiment of the present invention. As illustrated in FIG. 2, the confocal measurement device 100 according to the first embodiment constitutes a coaxial optical system in which light emission and light reception are coaxial in a head optical member and measures, for example, the thickness and the distance of a measurement object (hereinbelow, referred to as a workpiece) W using light Lb having a plurality of wavelengths which is emitted from a light emitting unit 10.

A ferrule 20 holds an end of an optical fiber 30 which transmits light emitted from the light emitting unit 10. An optical axis of the emitted light and a central axis of the ferrule 20 (the optical fiber 30) are present on a straight line.

A splitter 40 is connected to the ferrule 20, a light receiving unit 50, and a head unit 60 through the optical fiber 30. Light incident on the ferrule 20 is directly transmitted to the head unit 60, and reflected light from the head unit 60 is transmitted to the light receiving unit 50.

The optical fiber 30 is a transmission medium which transmits light emitted from the light emitting unit 10 to the head unit 60. The optical fiber 30 includes a core wire which is a light guide body and a resin film which covers the core wire.

The head unit 60 emits the light Lb having a plurality of wavelengths to the workpiece W, and part of reflected light reflected by the surface of the workpiece W enters the head unit 60. The reflected light from the workpiece W is transmitted to the light receiving unit 50 through the optical fiber 30 and the splitter 40. The light receiving unit 50 separates the transmitted reflected light into its spectral components to calculate the thickness and the distance of the workpiece W.

Figure 3:
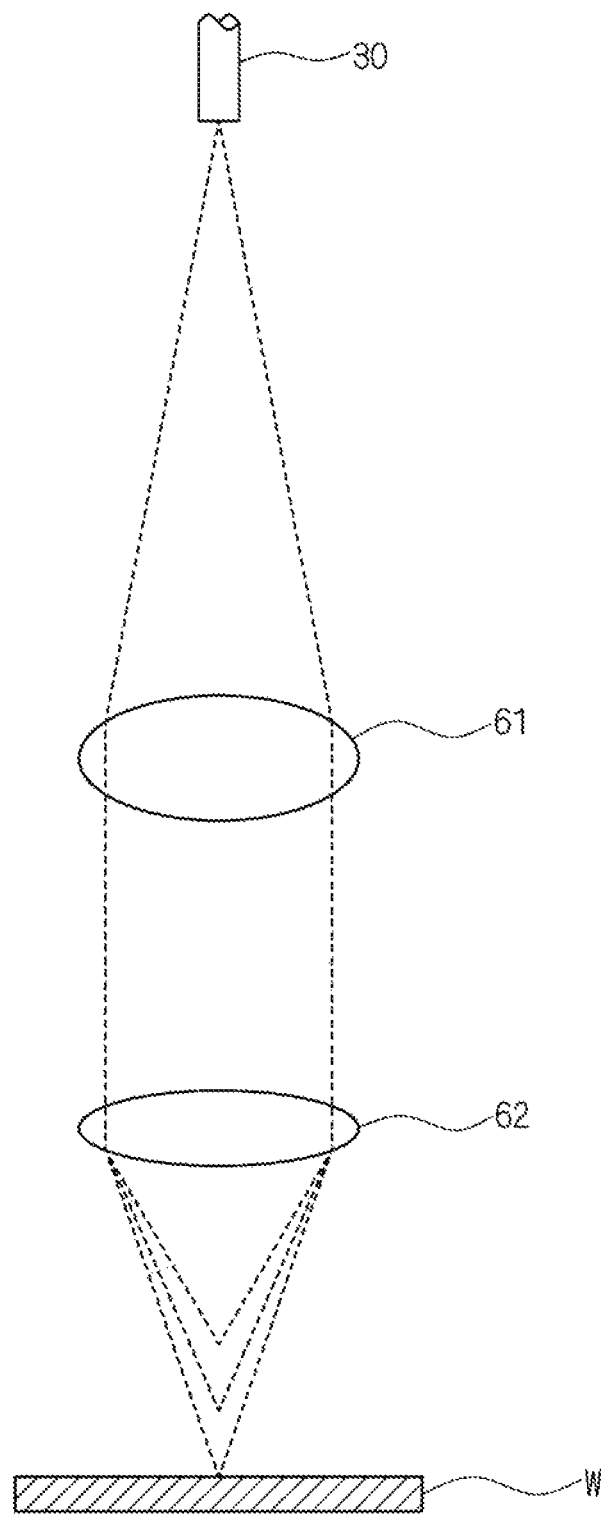
FIG. 3 is a schematic diagram illustrating the configuration of a head unit according to the first embodiment of the present invention.

FIG. 3 is a schematic diagram illustrating the configuration of the head unit 60 according to the first embodiment of the present invention. As illustrated in FIG. 3, the head unit 60 according to the first embodiment includes a collimator lens 61 and a lens 62 which is disposed closer to the workpiece W than the collimator lens 61 is.

Light emitted from the end of the optical fiber 30 is converted to parallel light by the collimator lens 61. The parallel light is concentrated on the workpiece W by the lens 62, and chromatic aberration occurs along the optical axis direction. Since the light concentration is performed by the lens 62, the focal length differs depending on the wavelength of light. Thus, the measurement accuracy largely depends on the wavelength of light.

Figure 4:
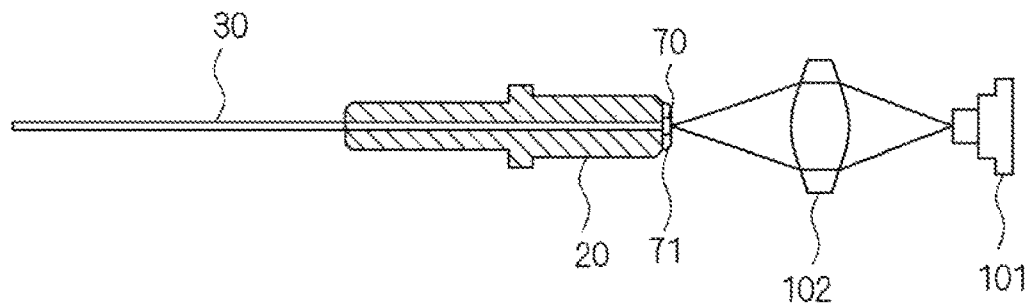
FIG. 4 is a schematic diagram illustrating a principal configuration of a light emitting unit according to the first embodiment of the present invention.

FIG. 4 is a schematic diagram illustrating a principal configuration of the light emitting unit 10 according to the first embodiment of the present invention. As illustrated in FIG. 4, light emitted from the laser light source 101 is allowed to enter the optical fiber 30 by a lens (optical member) 102. The focal position can be easily aligned with the tip part of the optical fiber 30 according to the distance from the laser light source 101. Thus, it is possible to allow light to efficiently enter the inside of the optical fiber 30. A tip part of the ferrule 20 at the side facing the lens (optical member) 102 (the tip part of the optical fiber 30) is thinly coated with a phosphor 70. The phosphor 70 may be fixed inside a light transmissive medium 71 such as a resin or glass which transmits light from the laser light source 101 and light emitted by the phosphor 70.

The phosphor 70 coated on the tip part of the optical fiber 30 at the side facing the lens 102 enables light having one or a plurality of wavelengths emitted from the laser light source 101 to enter the inside of the optical fiber 30 through the phosphor 70. Thus, even when light is wavelength-converted and diffused by the phosphor 70, it is possible to reliably concentrate the light onto the optical fiber 30 to allow the light to efficiently enter the inside of the optical fiber 30.

Figure 5:
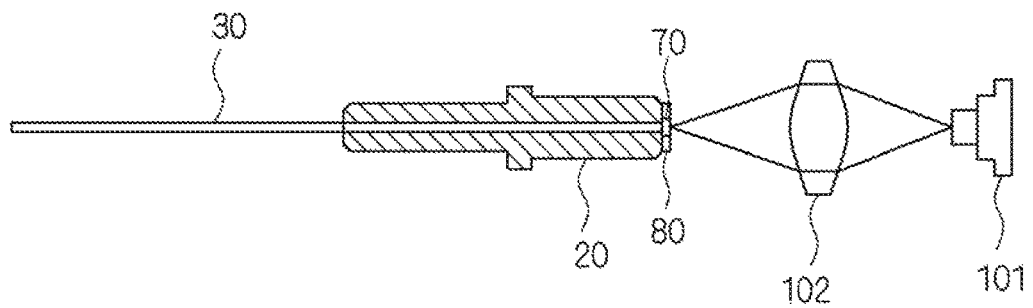
FIG. 5 is a schematic diagram illustrating a configuration provided with a frame body of the light emitting unit according to the first embodiment of the present invention.

In order to allow the light to more reliably enter the inside of the optical fiber 30, a frame body which surrounds the periphery of the phosphor 70 is preferably provided. FIG. 5 is a schematic diagram illustrating a configuration provided with the frame body of the light emitting unit 10 according to the first embodiment of the present invention.

As illustrated in FIG. 5, light emitted from the laser light source 101 is allowed to enter the optical fiber 30 by the lens 102. The tip part of the ferrule 20 at the side facing the lens (optical member) 102 (the tip part of the optical fiber 30) is thinly coated with the phosphor 70.

Figure 6A:
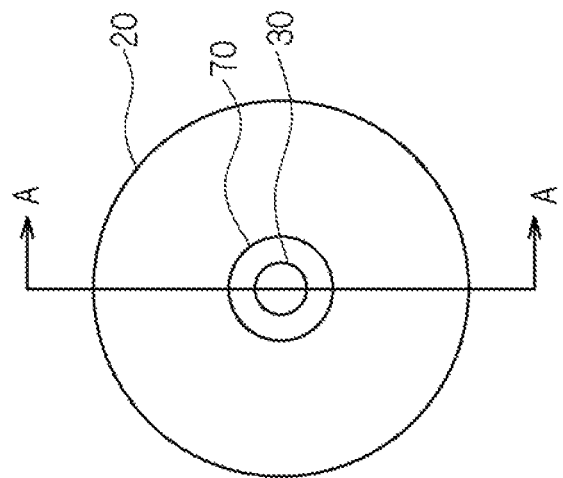
FIGS. 6A to 6C are enlarged schematic diagrams illustrating a part of the configuration provided with the frame body of the light emitting unit according to the first embodiment of the present invention.
Figure 6B:
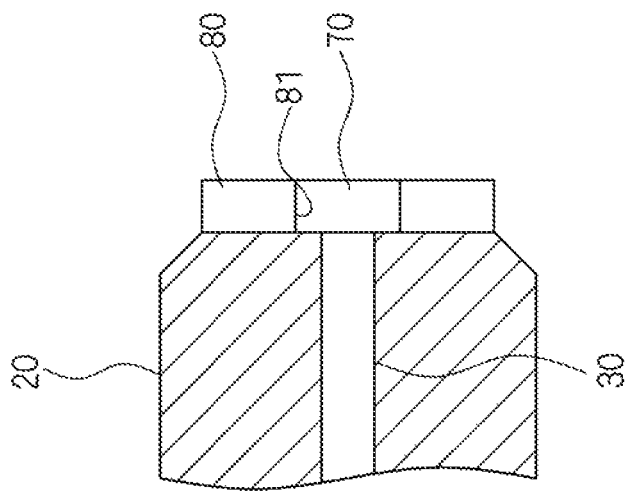
Figure 6C:
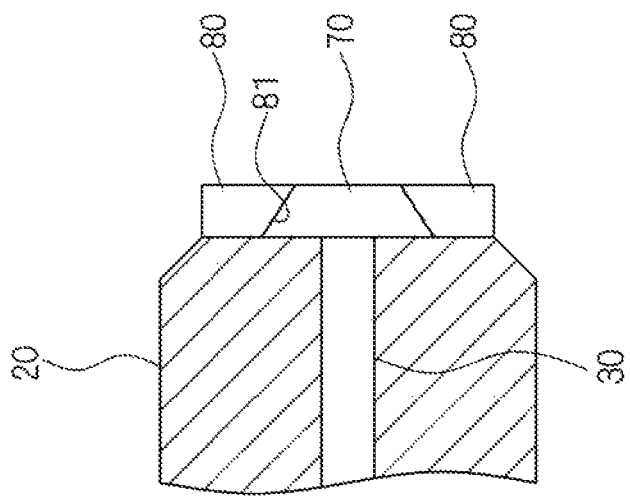

Further, an annular frame body surrounds the periphery of the phosphor 70. FIGS. 6A to 6C are enlarged schematic diagrams illustrating the configuration provided with the frame body of the light emitting unit 10 according to the first embodiment of the present invention. FIG. 6A is a front view of the tip part of the ferrule 20, and FIGS. 6B and 6C are sectional views taken along line A-A of FIG. 6A illustrating the tip part of the ferrule 20.

As illustrated in FIGS. 6A to 6C, the tip part of the ferrule 20 is coated with the phosphor 70, and a frame body 80 surrounds the periphery of the phosphor 70. The frame body 80 has an annular shape and includes an opening having a shape corresponding to the optical path of light incident on the entrance end of the optical fiber 30. The phosphor 70 or the phosphor 70 including the light transmissive medium 71 is preferably housed in the opening of the frame body 80.

As illustrated in FIG. 6B, a wall on the inner-diameter side of the frame body 80 is preferably provided with a reflecting surface 81 to enable light to more efficiently enter the inside of the optical fiber 30. Of course, the reflecting surface 81 may be parallel to the optical axis or inclined with respect to the optical axis. For example, as illustrated in FIG. 6C, when the frame body 80 has different opening diameters at the side facing the optical fiber 30 and the side facing the laser light source 101 (it is preferred that the opening diameter at the side facing the laser light source 101 be smaller), it is possible to allow reflected light to again enter the optical fiber 30 by the reflecting surface and thereby maintain a high transmission efficiency.

Figure 7A:
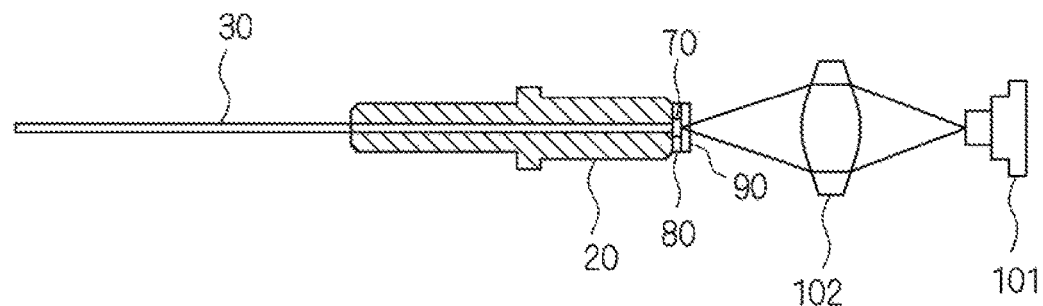
FIGS. 7A and 7B are schematic diagrams illustrating a configuration provided with a reflective filter of the light emitting unit according to the first embodiment of the present invention.
Figure 7B:
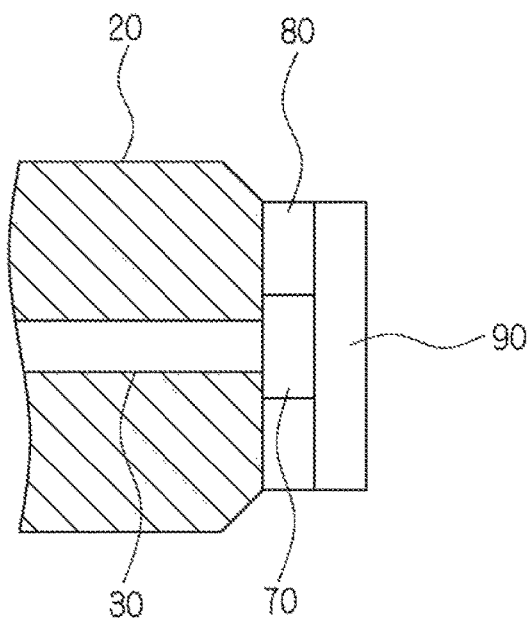

Of course, a reflective filter which covers the frame body 80 may be provided. FIGS. 7A and 7B are schematic diagrams illustrating a configuration provided with the reflective filter of the light emitting unit 10 according to the first embodiment of the present invention. FIG. 7A is a schematic diagram illustrating the configuration of the entire light emitting unit 10, and FIG. 7B is a schematic sectional view of the tip part of the ferrule 20.

As illustrated in FIGS. 7A and 7B, a reflective filter 90 covers the frame body 80 which surrounds the periphery of the phosphor 70. Setting the reflective filter 90 so as to transmit light from the laser light source 101 and reflect light wavelength-converted by the phosphor 70 enables the wavelength-converted light to more efficiently enter the inside of the optical fiber 30.

Figure 8A:
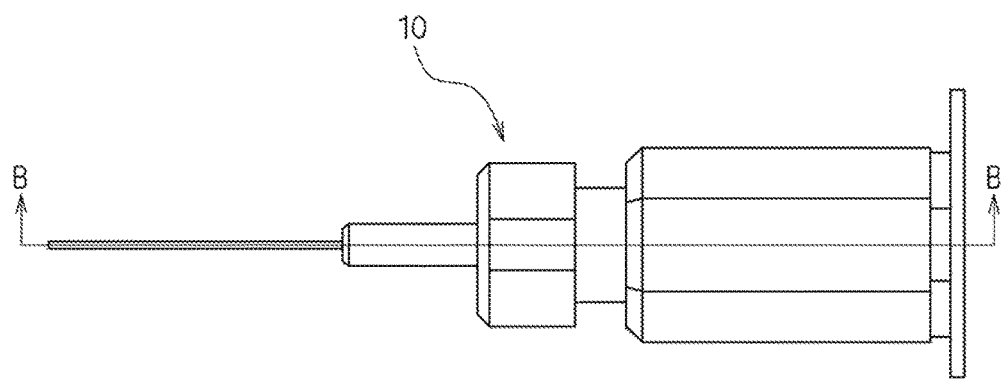
FIGS. 8A and 8B are front and sectional views illustrating the configuration of the light emitting unit according to the first embodiment of the present invention.
Figure 8B:
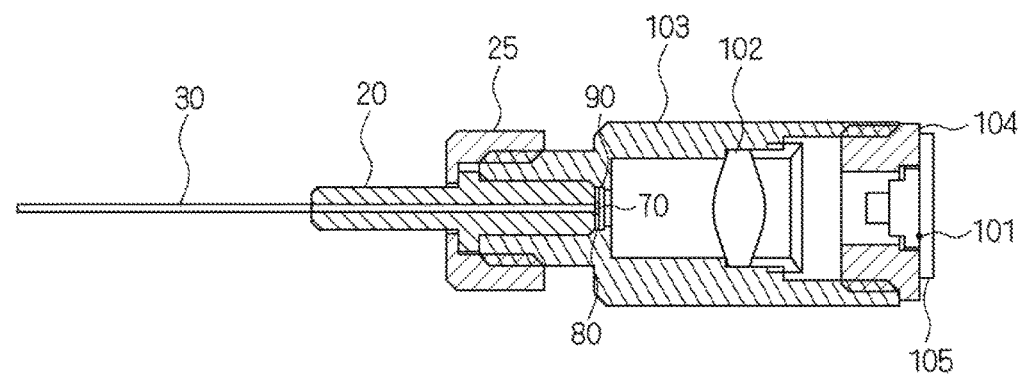

FIGS. 8A and 8B are front and sectional views illustrating the configuration of the light emitting unit 10 according to the first embodiment of the present invention. FIG. 8A is a front view illustrating the configuration of the light emitting unit 10, and FIG. 8B is a sectional view taken along line B-B of FIG. 8A illustrating the configuration of the light emitting unit 10.

As illustrated in FIGS. 8A and 8B, in the light emitting unit 10, the ferrule 20 with the optical fiber 30 incorporated is fixed by a ferrule presser 25. The ferrule presser 25 adheres to one end part of a lens holder 103 which fixes the lens 102 in a manner to cover the end part. A light source holder 104 with the laser light source 101 attached together with a drive board 105 is inserted to the other end part of the lens holder 103.

The tip part of the ferrule 20 (the tip part of the optical fiber 30) is coated with the phosphor 70, and the frame body 80 surrounds the phosphor 70. The reflective filter 90 covers the frame body 80 so as to enable the wavelength-converted light to more efficiently enter the inside of the optical fiber 30.

Of course, the configuration of the tip part of the ferrule 20 is not limited thereto. The phosphor 70 may be merely coated as illustrated in FIG. 4, or the frame body 80 may surround the periphery of the coated phosphor 70 as illustrated in FIG. 5.

Figure 9:
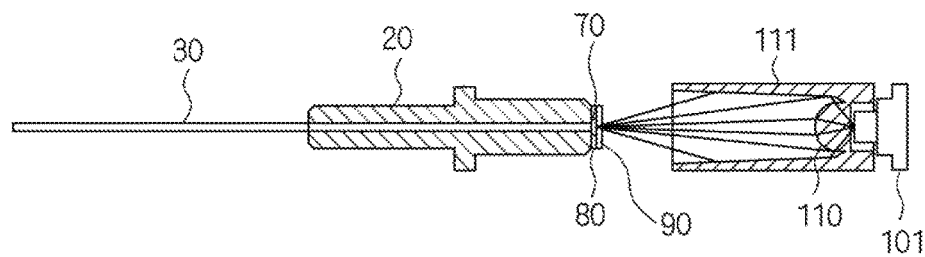
FIG. 9 is a schematic diagram illustrating a configuration that uses a tubular reflecting mirror in the light emitting unit according to the first embodiment of the present invention.

In the first embodiment described above, the lens 102 is used as the optical member. Alternatively, a reflecting mirror may be used instead of the lens 102. FIG. 9 is a schematic diagram illustrating a configuration that uses a tubular reflecting mirror in the light emitting unit 10 according to the first embodiment of the present invention. As illustrated in FIG. 9, light having one or a plurality of wavelengths emitted from the laser light source 101 is allowed to enter the inside of the optical fiber 30 through a lens (optical member) 110 by a reflecting mirror 111. Light that is diffused to the outside when a single lens is used can also be allowed to enter the inside of the optical fiber 30 by the reflecting mirror 111. Thus, attenuation of the light intensity can be reduced.

The tip part of the ferrule 20 at the side facing the lens (optical member) 110 (the tip part of the optical fiber 30) is thinly coated with the phosphor 70. The phosphor 70 coated on the tip part of the optical fiber 30 at the side facing the lens 110 enables light having one or a plurality of wavelengths emitted from the laser light source 101 to enter the inside of the optical fiber 30 through the phosphor 70. Thus, even when light is wavelength-converted and diffused by the phosphor 70, it is possible to reliably concentrate the light onto the optical fiber 30 to allow the light to efficiently enter the inside of the optical fiber 30.

In order to allow light to more reliably enter the inside of the optical fiber 30, the frame body 80 which surrounds the periphery of the phosphor may be provided, or the reflective filter 90 which covers the frame body 80 may be provided. Both the configurations enable the wavelength-converted light to more efficiently enter the inside of the optical fiber 30.

Figure 10:
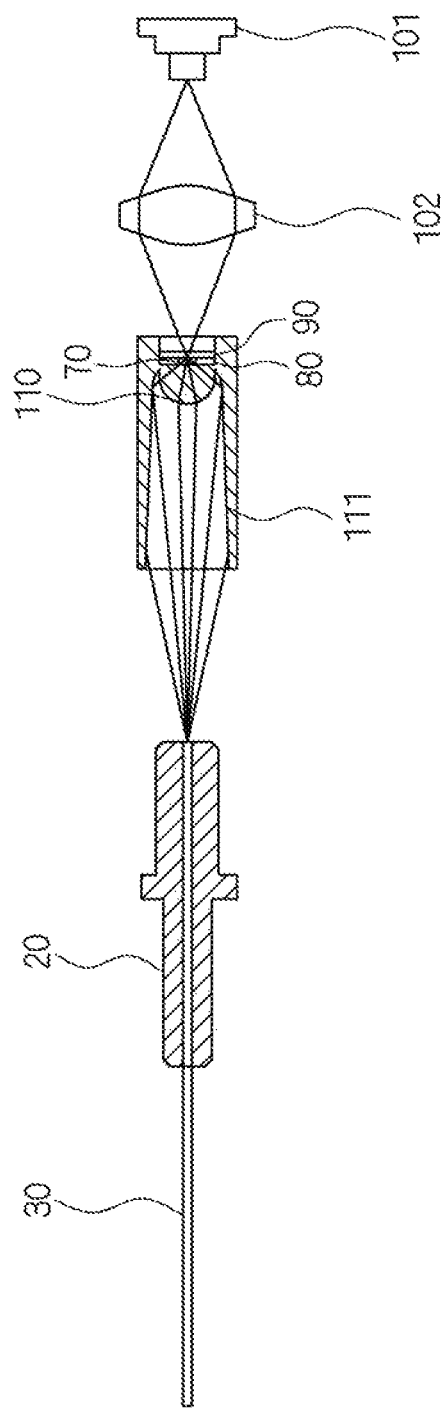
FIG. 10 is a schematic diagram illustrating a configuration that uses both a lens and the tubular reflecting mirror in the light emitting unit according to the first embodiment of the present invention.

Further, both one or a plurality of lenses and the tubular reflecting mirror with the lens incorporated may be used as the optical member which allows light to enter the inside of the optical fiber 30 which is incorporated in the ferrule 20. FIG. 10 is a schematic diagram illustrating a configuration that uses both the lens and the tubular reflecting mirror in the light emitting unit 10 according to the first embodiment of the present invention.

In the example of FIG. 10, a lens 102 is disposed between the laser light source 101 and the reflecting mirror 111, and the phosphor 70 is coated on the tip part of the reflecting mirror 111 at the side facing the laser light source 101 and the lens 102. Accordingly, it is possible to allow light including light that cannot enter the inside of the optical fiber 30 due to the restriction on the number of openings of the optical fiber 30 to enter the inside of the optical fiber 30 and reduce the loss in the light intensity.

Similarly to the above embodiment, the frame body 80 which surrounds the periphery of the phosphor 70 may be provided, and a wall on the inner-diameter side of the frame body 80 may be provided with the reflecting surface 81. Further, the reflective filter 90 may cover the frame body 80. Both the configurations enable light wavelength-converted by the phosphor 70 to more efficiently enter the inside of the optical fiber 30.

Figure 11:
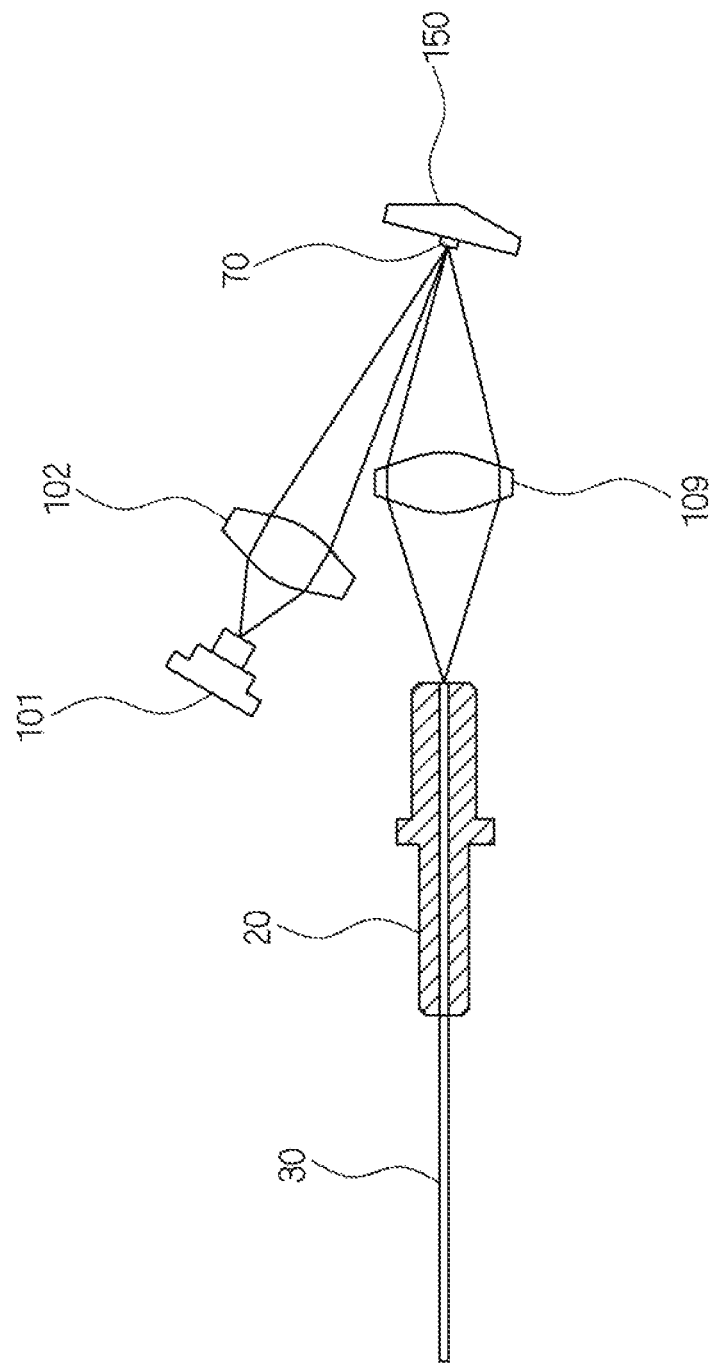
FIG. 11 is a schematic diagram illustrating a configuration of the light emitting unit according to the first embodiment of the present invention in which the arrangement of a laser light source is changed.

The present invention is not limited to the configuration in which the optical axis of light emitted from the laser light source 101 and the central axis of the optical fiber 30 (the ferrule 20) are present on a straight line. FIG. 11 is a schematic diagram illustrating a configuration of the light emitting unit 10 according to the first embodiment of the present invention in which the arrangement of the laser light source 101 is changed.

In the example of FIG. 11, a reflecting mirror 150 which reflects light emitted from the laser light source 101 toward the optical fiber 30 is provided. The light having one or a plurality of wavelengths emitted from the laser light source 101 is concentrated by the lens 102 and guided to the reflecting mirror 150. The reflecting mirror 150 has a surface coated with the phosphor 70 and reflects light wavelength-converted by the phosphor 70.

The light reflected by the reflecting mirror 150 is concentrated by the lens 109 and enters the tip part of the optical fiber 30 incorporated in the ferrule 20. Accordingly, the flexibility in the arrangement of the optical member is increased, which enables the entire device to be downsized.

In order to increase the light intensity, it is necessary to increase the amount of light. The increase in the amount of light may cause the phosphor 70 to generate heat. The heat generation of the phosphor 70 reduces the reflection efficiency, which may results in saturation of light emission. When the reflecting mirror 150 is used, the heat generation of the phosphor 70 can be reduced by rotating or moving the reflecting mirror 150. Thus, the above problem can be solved.

Figure 12:
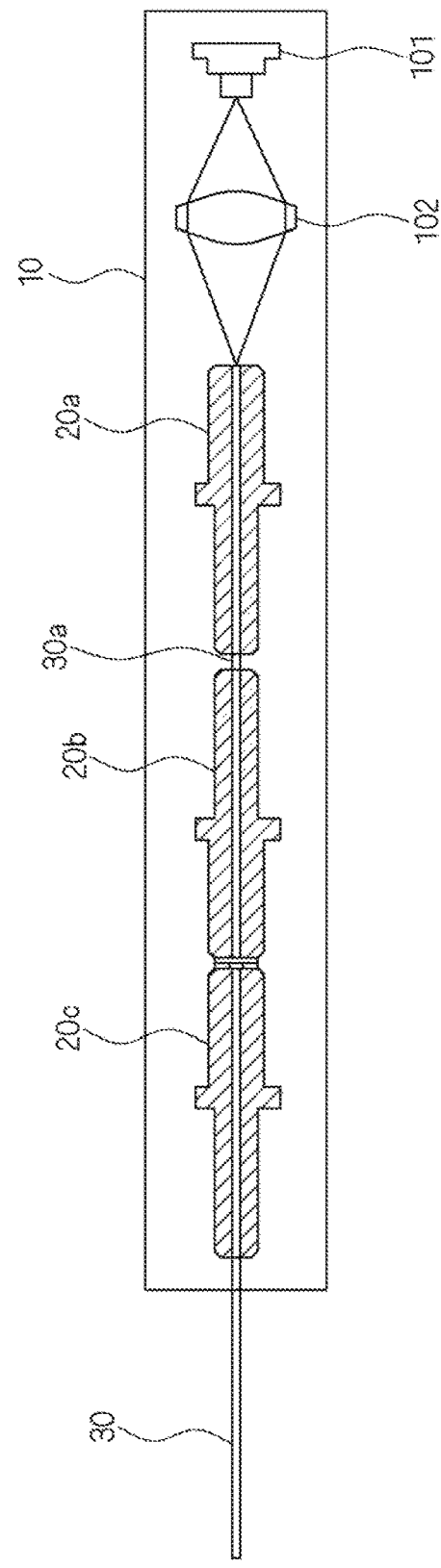
FIG. 12 is a schematic diagram illustrating a configuration of the light emitting unit according to the first embodiment of the present invention in which a plurality of optical fibers are coupled.

A plurality of optical fibers 30 may be coupled inside the light emitting unit 10. FIG. 12 is a schematic diagram illustrating a configuration of the light emitting unit 10 according to the first embodiment of the present invention in which a plurality of optical fibers 30 are coupled.

In the example of FIG. 12, an optical fiber 30a which is incorporated in ferrules 20a, 20b is disposed at the side facing the laser light source 101, and an optical fiber 30 which is incorporated in a ferrule 20c is disposed at the side opposite to the laser light source 101. The phosphor 70 is coated only on the ferrule 20c at the side facing the lens 102 between the ferrule 20b and the ferrule 20c.

Figure 13:
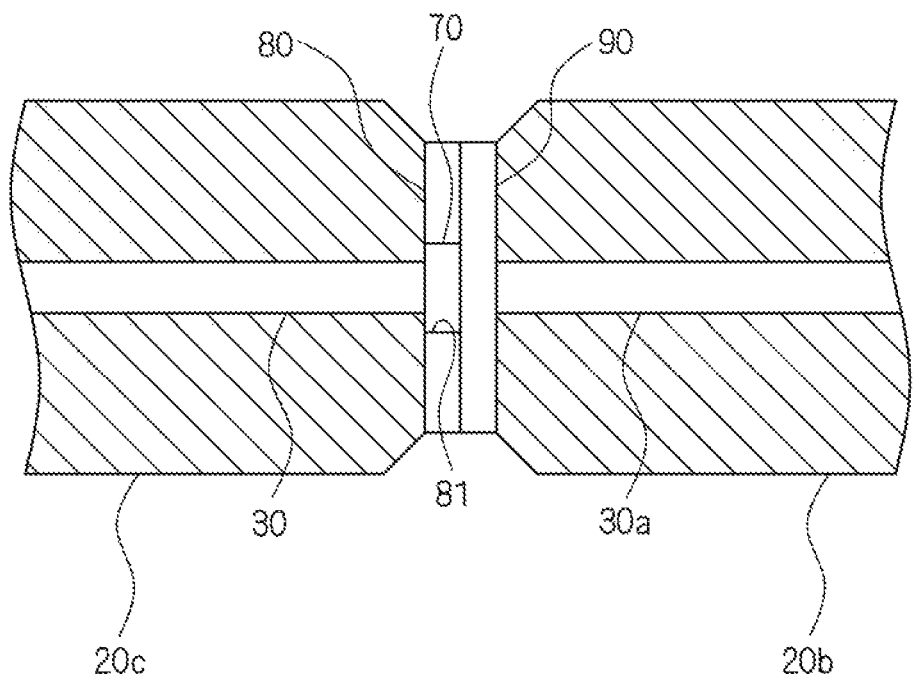
FIG. 13 is an enlarged schematic diagram illustrating a configuration of a part in which the plurality of optical fibers are coupled in the light emitting unit according to the first embodiment of the present invention.

FIG. 13 is an enlarged schematic diagram illustrating a configuration of a part in which the plurality of optical fibers 30 are coupled in the light emitting unit 10 according to the first embodiment of the present invention. As illustrated in FIG. 13, the phosphor 70 is coated on the tip part of the optical fiber 30 in the ferrule 20c at the side facing the lens (optical member) 102. Although coating the phosphor 70 is sufficient, the frame body 80 which surrounds the periphery of the phosphor 70 may be provided, and the wall on the inner-diameter side of the frame body 80 may be provided with the reflecting surface 81 similarly to the above embodiment to allow light to more efficiently enter the inside of the optical fiber 30. Further, the reflective filter 90 may cover the frame body 80. All the configurations enable light wavelength-converted by the phosphor 70 to more efficiently enter the inside of the optical fiber 30.

Although, in FIG. 13, the lens 102 is used to concentrate light emitted from the laser light source 101 onto the optical fiber 30a incorporated in the ferrule 20a, the present invention is not particularly limited thereto. It is needless to say that the reflecting mirror 111 illustrated in FIG. 9 may be used, or the plurality of lenses 102, 110 and the reflecting mirror 111 may be used as illustrated in FIG. 10.

As described above, the first embodiment makes it possible to allow light having one or a plurality of wavelengths emitted from the laser light source 101 to enter the inside of the optical fiber 30 through the phosphor 70 which is coated on the tip part of the optical fiber 30 at the side facing the optical member. Thus, even when light is wavelength-converted and diffused by the phosphor 70, it is possible to reliably concentrate the light to allow the light to efficiently enter the inside of the optical fiber 30. Therefore, it is possible to measure the thickness and the distance of a measurement object with high accuracy.

Second Embodiment

Figure 14:
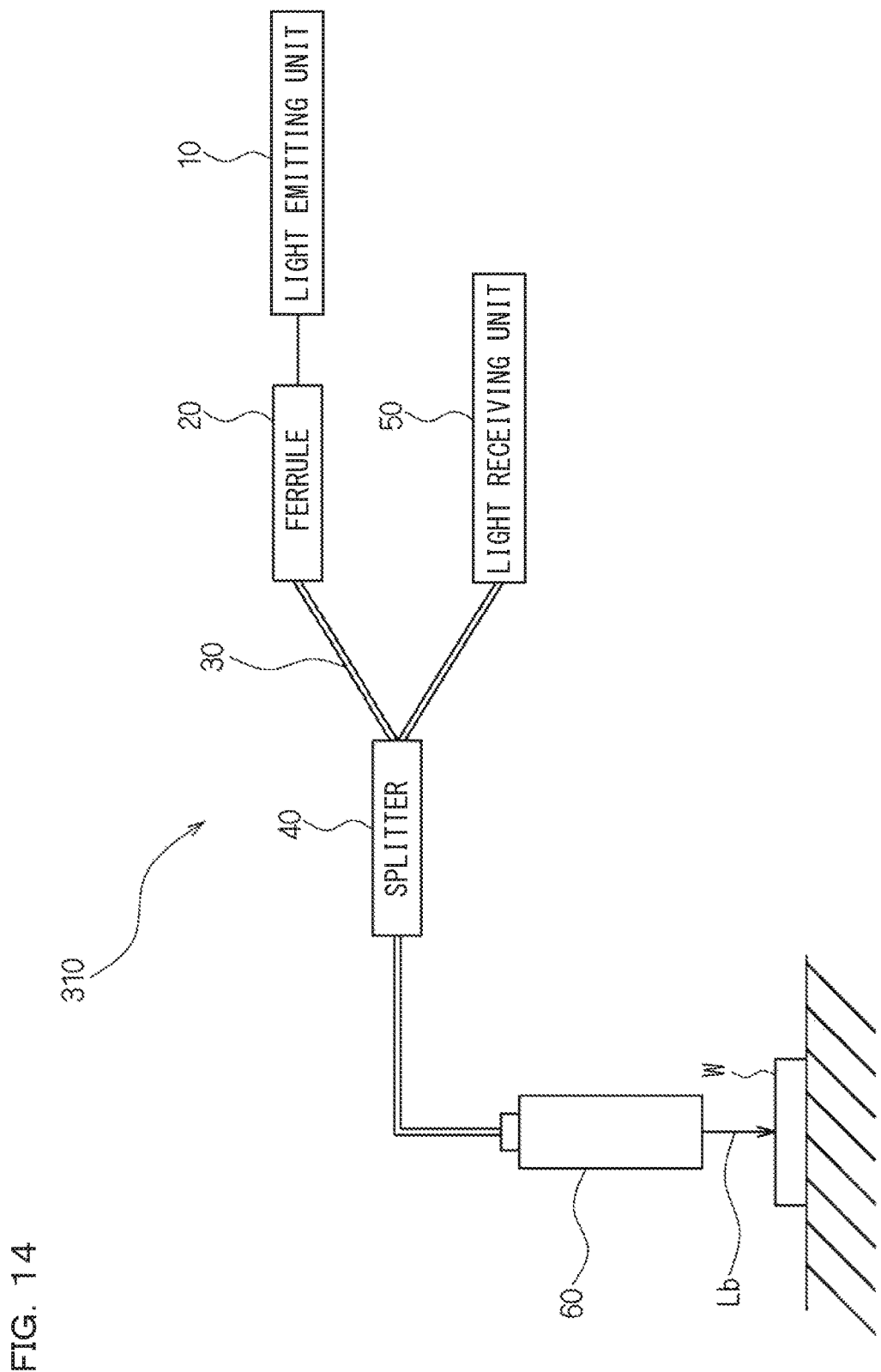
FIG. 14 is a block diagram schematically illustrating the configuration of an interference measurement device which is a multi-wavelength photoelectric measurement device according to a second embodiment of the present invention.

FIG. 14 is a block diagram schematically illustrating the configuration of an interference measurement device which is a multi-wavelength photoelectric measurement device according to a second embodiment of the present invention. As illustrated in FIG. 14, the interference measurement device 310 according to the second embodiment measures, for example, the thickness and the distance of a measurement object (hereinbelow, referred to as a workpiece) W using light Lb having a plurality of wavelengths which is emitted from a light emitting unit 10.

A ferrule 20 holds an end of an optical fiber 30 which transmits light emitted from the light emitting unit 10. An optical axis of the emitted light and a central axis of the ferrule 20 (the optical fiber 30) are present on a straight line.

A splitter 40 is connected to the ferrule 20, a light receiving unit 50, and a head unit 60 through the optical fiber 30. Light incident on the ferrule 20 is directly transmitted to the head unit 60, and reflected light from the head unit 60 is transmitted to the light receiving unit 50.

The optical fiber 30 is a transmission medium which transmits light emitted from the light emitting unit 10 to the head unit 60. The optical fiber 30 includes a core wire which is a light guide body and a resin film which covers the core wire.

The head unit 60 emits the light Lb having a plurality of wavelengths to the workpiece W, and part of reflected light reflected by the surface of the workpiece W enters the head unit 60. The reflected light from the workpiece W and reflected light generated in the head unit 60 are transmitted to the light receiving unit 50 through the optical fiber 30 and the splitter 40. The light receiving unit 50 separates the transmitted reflected light into its spectral components to calculate the thickness of the workpiece W.

Figure 15:
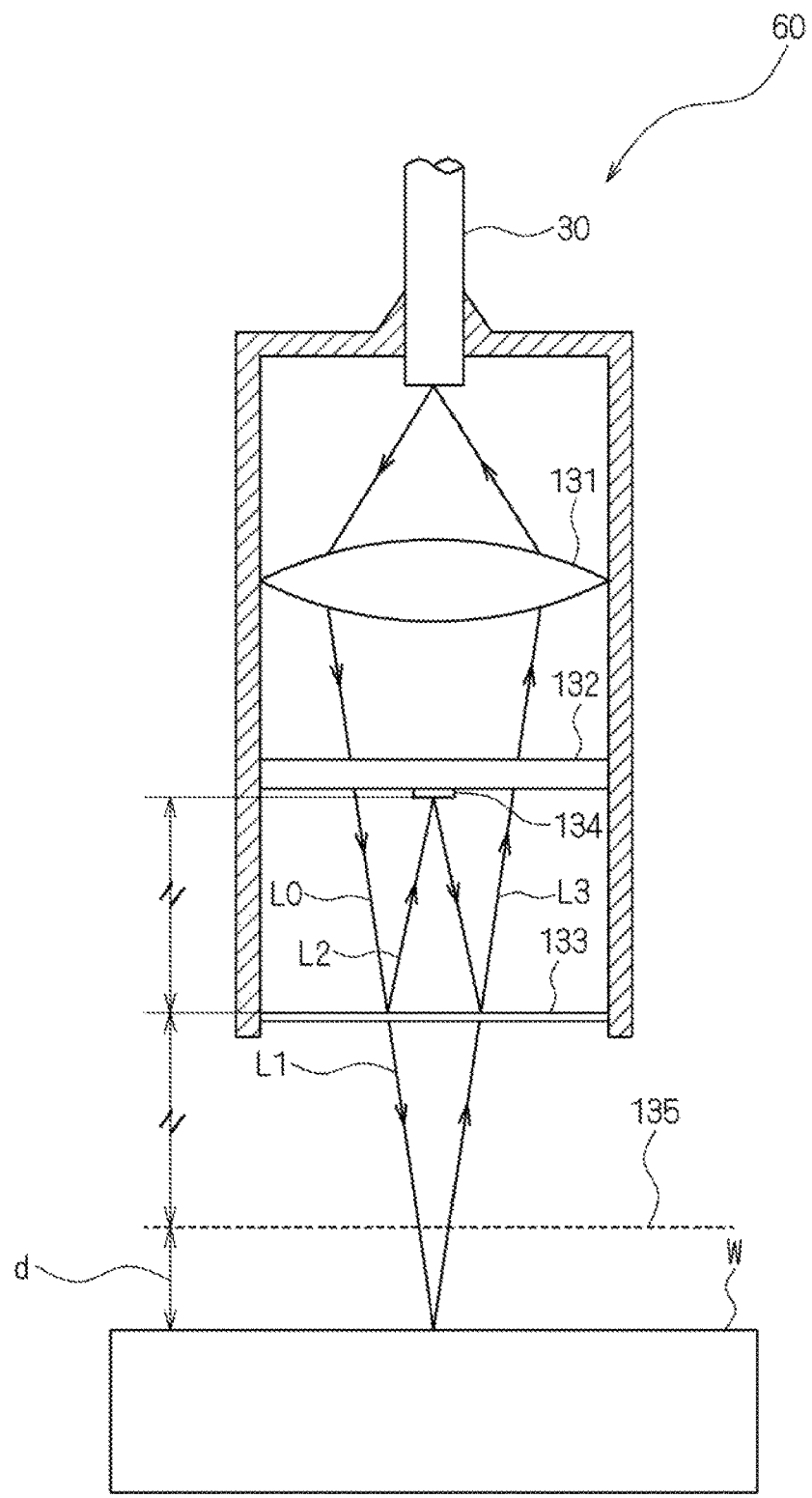
FIG. 15 is a schematic diagram illustrating the configuration of a head unit according to the second embodiment of the present invention.

FIG. 15 is a schematic diagram illustrating the configuration of the head unit 60 according to the second embodiment of the present invention. As illustrated in FIG. 15, the head unit 60 according to the second embodiment is provided with an interference optical system which generates interference reflected light L3 for measuring the film thickness of a workpiece W.

The interference optical system according to the second embodiment is a Mirau type interference optical system and includes a condenser lens 131, a glass plate 132, a half mirror 133, and a pin mirror 134. Part of light L0 emitted from the tip part of the optical fiber 30 is emitted as detection light L1, and reflected light reflected by the surface of the workpiece W enters the tip part of the optical fiber 30. Then, the interference reflected light L3 is generated from reflected light of the light L0 reflected by a reference plane and reflected light of the detection light L1 reflected by the surface of the workpiece W and enters the tip part of the optical fiber 30.

The light L0 concentrated on the condenser lens 131 is separated to transmitted light and reflected light by the half mirror 133. The pin mirror 134 is disposed on the center of the glass plate 132 and reflects the reflected light of the light L0 reflected by the half mirror 133 toward the half mirror 133. Accordingly, a virtual reference plane 135 is formed. The pin mirror 134 is formed at a position that allows the reflected light of the light L0 by the reference plane and the reflected light of the detection light L1 by the surface of the workpiece W to have the same phase when the distance d between the workpiece W and the virtual reference plane 135 is zero.

Detection light L2 formed by reflecting the light L0 by the half mirror 133 enters the pin mirror 134. The detection light L2 reflected by the pin mirror 134 is partially reflected by the half mirror 133 toward the condenser lens 131.

The film thickness of the workpiece W is obtained as the distance d between the virtual reference plane 135 and the workpiece W on the basis of the interference reflected light L3.

Figure 16A:
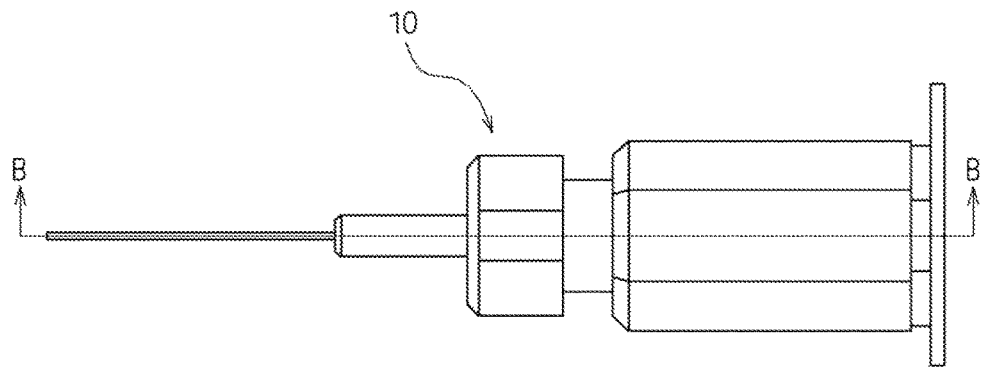
FIGS. 16A and 16B are front and sectional views illustrating the configuration of a light emitting unit according to the second embodiment of the present invention.
Figure 16B:
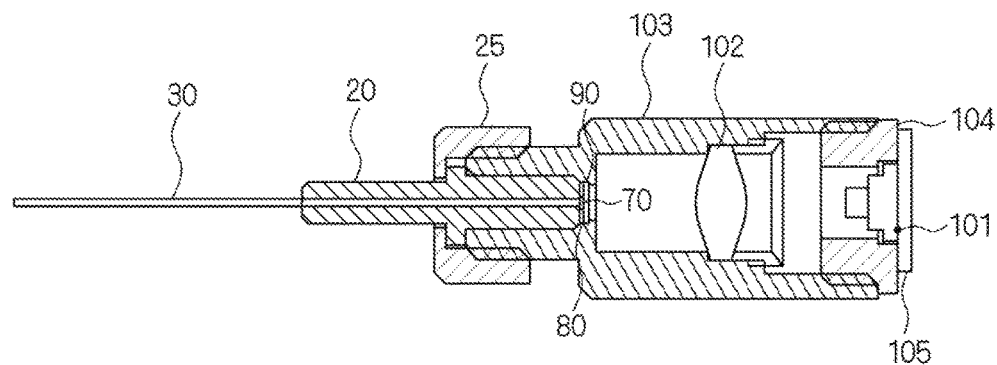

FIGS. 16A and 16B are front and sectional views illustrating the configuration of the light emitting unit 10 according to the second embodiment of the present invention. FIG. 16A is a front view illustrating the configuration of the light emitting unit 10, and FIG. 16B is a sectional view taken along line B-B of FIG. 16A illustrating the configuration of the light emitting unit 10.

As illustrated in FIGS. 16A and 16B, in the light emitting unit 10, the ferrule 20 with the optical fiber 30 incorporated is fixed by a ferrule presser 25. The ferrule presser 25 adheres to one end part of a lens holder 103 which fixes the lens 102 in a manner to cover the end part. A light source holder 104 with the laser light source 101 attached together with a drive board 105 is inserted to the other end part of the lens holder 103.

The tip part of the ferrule 20 (the tip part of the optical fiber 30) is coated with a phosphor 70. A frame body 80 surrounds the phosphor 70. A reflective filter 90 covers the frame body 80 so as to enable wavelength-converted light to more efficiently enter the optical fiber 30.

Of course, the configuration of the tip part of the ferrule 20 is not limited thereto. Similarly to the first embodiment, the phosphor 70 may be merely coated, or the frame body 80 may surround the periphery of the coated phosphor 70.

Figure 17:
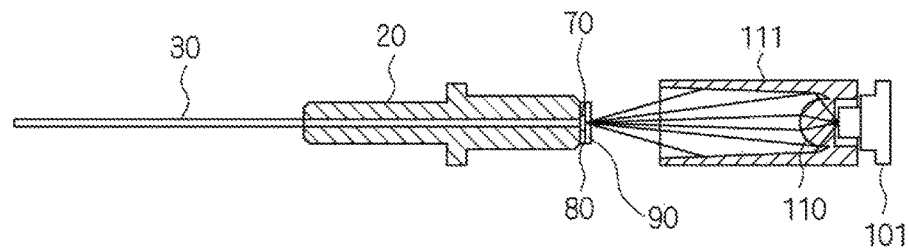
FIG. 17 is a schematic diagram illustrating a configuration that uses a tubular reflecting mirror in the light emitting unit according to the second embodiment of the present invention.

In the above second embodiment, the lens 102 is used as the optical member. Alternatively, a reflecting mirror may be used instead of the lens 102. FIG. 17 is a schematic diagram illustrating a configuration that uses a tubular reflecting mirror in the light emitting unit 10 according to the second embodiment. As illustrated in FIG. 17, light having a plurality of wavelengths emitted from the laser light source 101 is allowed to enter the inside of the optical fiber 30 through a lens (optical member) 110 by a reflecting mirror 111. Light that is diffused to the outside when a single lens is used can also be allowed to enter the inside of the optical fiber 30 by the reflecting mirror 111. Thus, attenuation of the light intensity can be reduced.

The tip part of the ferrule 20 at the side facing the lens (optical member) 110 (the tip part of the optical fiber 30) is thinly coated with the phosphor 70. The phosphor 70 coated on the tip part of the optical fiber 30 at the side facing the lens 110 enables light having one or a plurality of wavelengths emitted from the laser light source 101 to enter the inside of the optical fiber 30 through the phosphor 70. Thus, even when light is wavelength-converted and diffused by the phosphor 70, it is possible to reliably concentrate the light onto the optical fiber 30 to allow the light to efficiently enter the inside of the optical fiber 30.

In order to allow light to more reliably enter the inside of the optical fiber 30, the frame body 80 which surrounds the periphery of the phosphor may be provided, or the reflective filter 90 which covers the frame body 80 may be provided. Both the configurations enable the wavelength-converted light to more efficiently enter the inside of the optical fiber 30.

Figure 18:
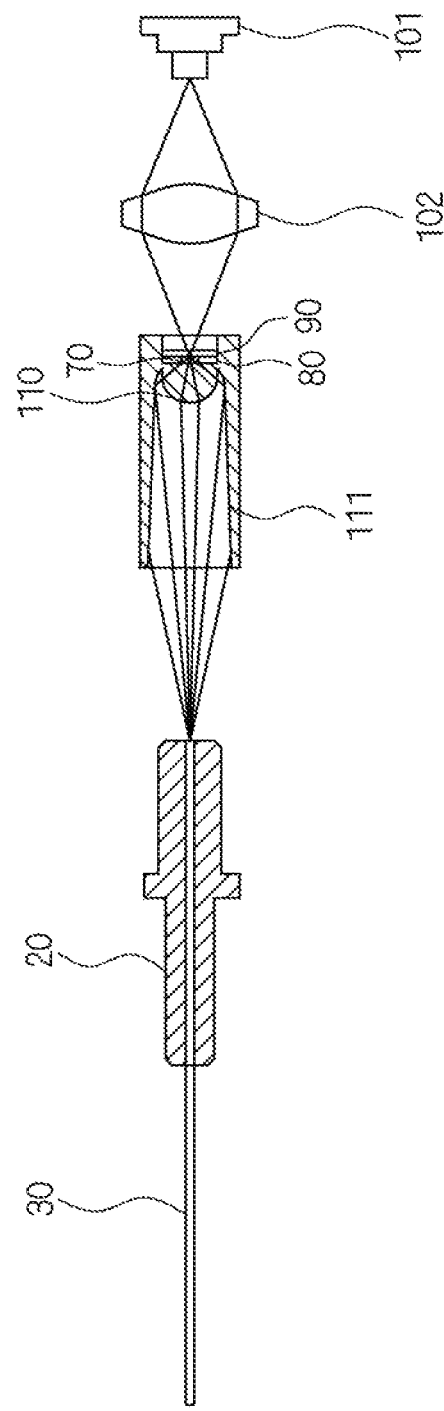
FIG. 18 is a schematic diagram illustrating a configuration that uses both a lens and the tubular reflecting mirror in the light emitting unit according to the second embodiment of the present invention.

Further, both one or a plurality of lenses and the tubular reflecting mirror with the lens incorporated may be used as the optical member which allows light to enter the inside of the optical fiber 30 which is incorporated in the ferrule 20. FIG. 18 is a schematic diagram illustrating a configuration that uses both the lens and the tubular reflecting mirror in the light emitting unit 10 according to the second embodiment of the present invention.

In the example of FIG. 18, a lens 102 is disposed between the laser light source 101 and the reflecting mirror 111, and the phosphor 70 is coated on the tip part of the reflecting mirror 111 at the side facing the laser light source 101 and the lens 102. Accordingly, it is possible to allow light including light that cannot enter the inside of the optical fiber 30 due to the restriction on the number of openings of the optical fiber 30 to enter the inside of the optical fiber 30 and reduce the loss in the light intensity.

Similarly to the first embodiment, the frame body 80 which surrounds the periphery of the phosphor 70 may be provided, and a wall on the inner-diameter side of the frame body 80 may be provided with the reflecting surface 81.

Further, the reflective filter 90 may cover the frame body 80. Both the configurations enable light wavelength-converted by the phosphor 70 to more efficiently enter the inside of the optical fiber 30.

Figure 19:
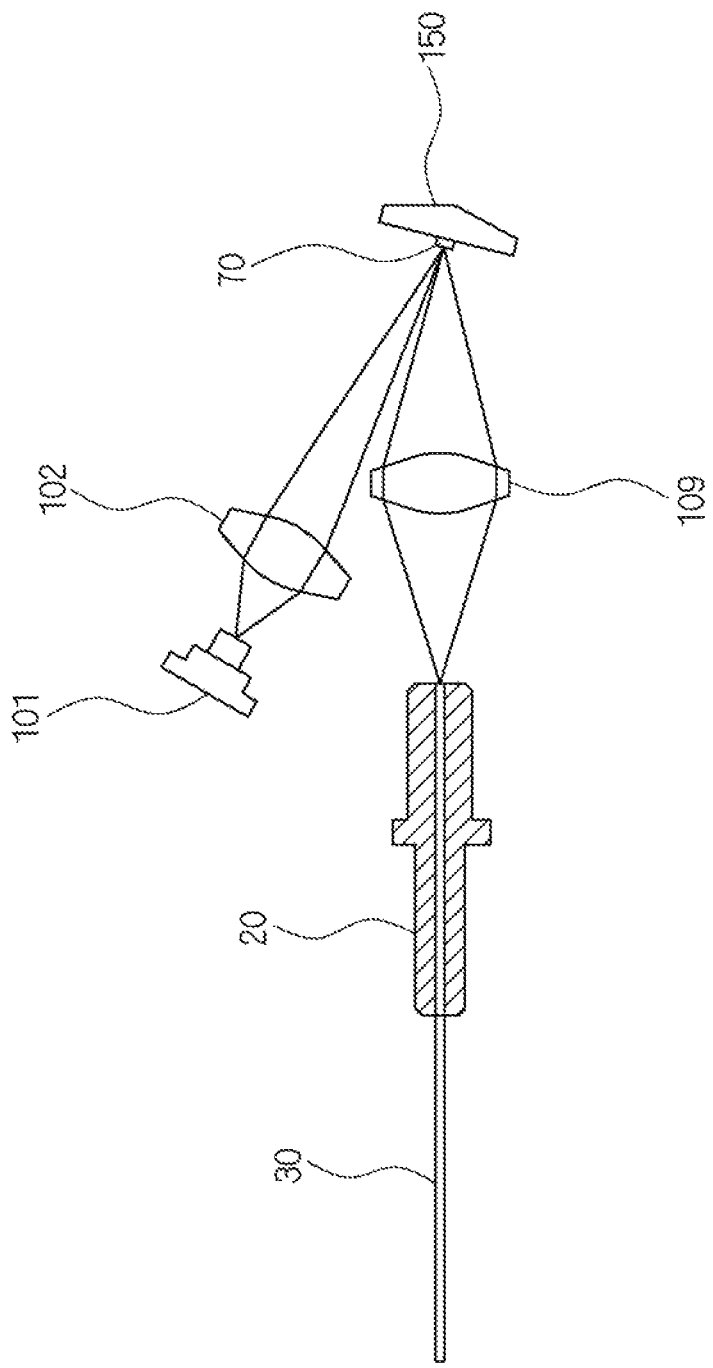
FIG. 19 is a schematic diagram illustrating a configuration of the light emitting unit according to the second embodiment of the present invention in which the arrangement of a laser light source is changed.

The present invention is not limited to the configuration in which the optical axis of light emitted from the laser light source 101 and the central axis of the optical fiber 30 (the ferrule 20) are present on a straight line. FIG. 19 is a schematic diagram illustrating a configuration of the light emitting unit 10 according to the second embodiment of the present invention in which the arrangement of the laser light source 101 is changed.

In the example of FIG. 19, a reflecting mirror 150 which reflects light emitted from the laser light source 101 toward the optical fiber 30 is provided. The light having one or a plurality of wavelengths emitted from the laser light source 101 is concentrated by the lens 102 and guided to the reflecting mirror 150. The reflecting mirror 150 has a surface coated with the phosphor 70 and reflects light wavelength-converted by the phosphor 70.

The light reflected by the reflecting mirror 150 is concentrated by the lens 109 and enters the tip part of the optical fiber 30 incorporated in the ferrule 20. Accordingly, the flexibility in the arrangement of the optical member is increased, which enables the entire device to be downsized.

In order to increase the light intensity, it is necessary to increase the amount of light. The increase in the amount of light may cause the phosphor 70 to generate heat. The heat generation of the phosphor 70 reduces the reflection efficiency, which may results in saturation of light emission. When the reflecting mirror 150 is used, the heat generation of the phosphor 70 can be reduced by rotating or moving the reflecting mirror 150. Thus, the above problem can be solved.

Figure 20:
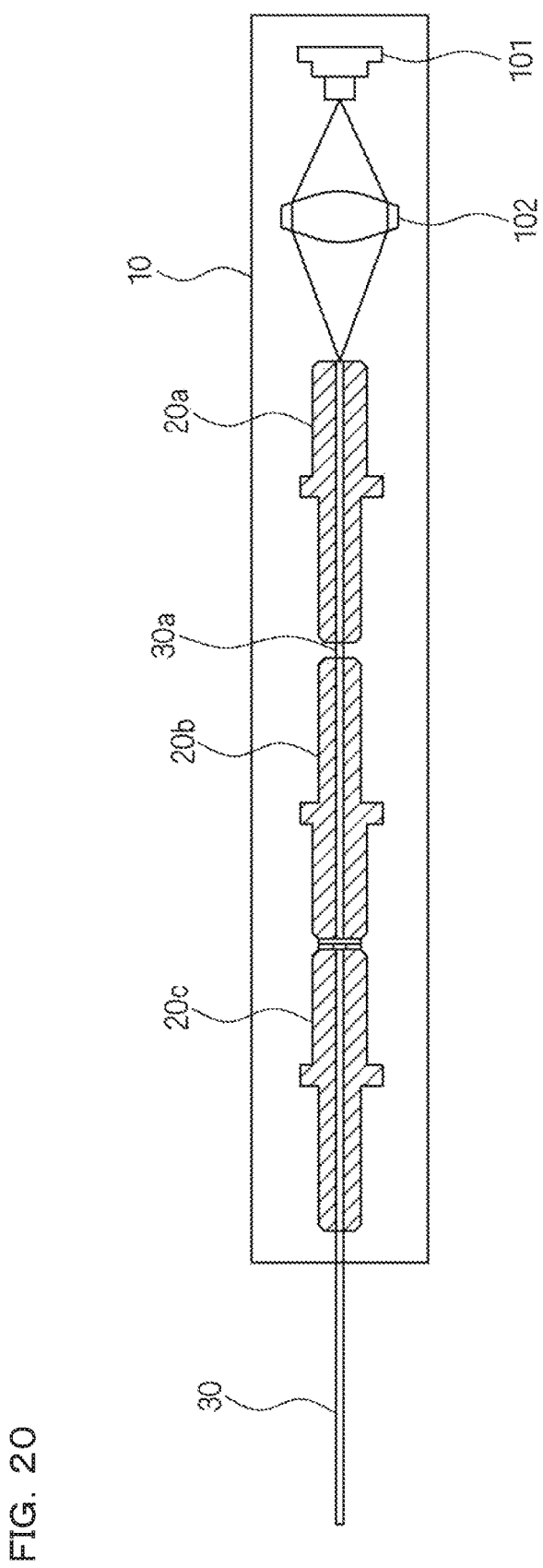
FIG. 20 is a schematic diagram illustrating a configuration of the light emitting unit according to the second embodiment of the present invention in which a plurality of optical fibers are coupled.

A plurality of optical fibers 30 may be coupled inside the light emitting unit 10. FIG. 20 is a schematic diagram illustrating a configuration of the light emitting unit 10 according to the second embodiment of the present invention in which a plurality of optical fibers 30 are coupled.

In the example of FIG. 20, an optical fiber 30a which is incorporated in ferrules 20a, 20b is disposed at the side facing the laser light source 101, and an optical fiber 30 which is incorporated in a ferrule 20c is disposed at the side opposite to the laser light source 101. The phosphor 70 is coated only on the ferrule 20c at the side facing the lens 102 between the ferrule 20b and the ferrule 20c.

Figure 21:
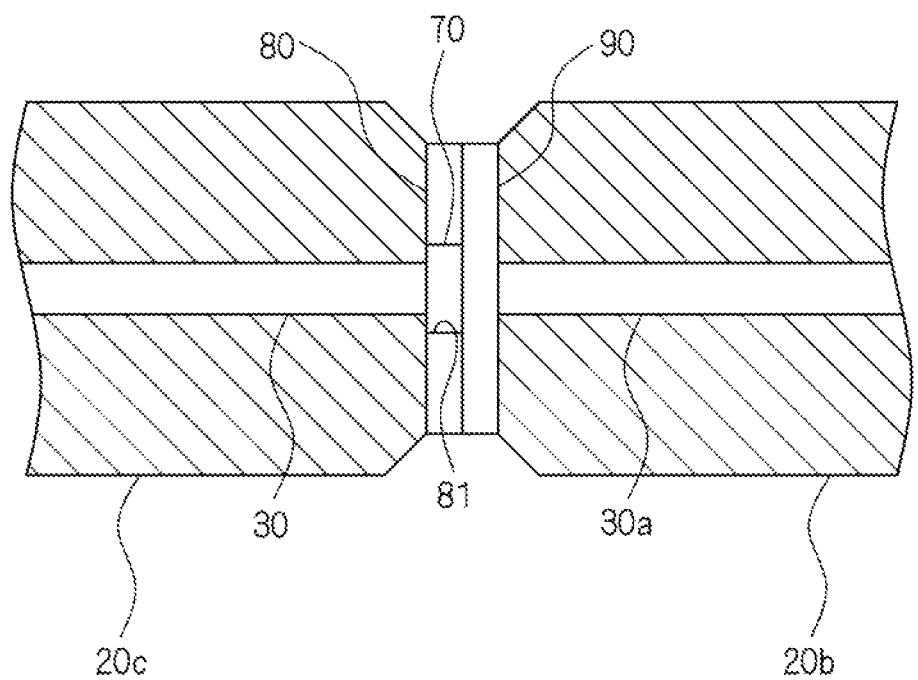
FIG. 21 is an enlarged schematic diagram illustrating a configuration of a part in which the plurality of optical fibers are coupled in the light emitting unit according to the second embodiment of the present invention.

FIG. 21 is an enlarged schematic diagram illustrating a configuration of a part in which the plurality of optical fibers 30 are coupled in the light emitting unit 10 according to the second embodiment of the present invention. As illustrated in FIG. 21, the phosphor 70 is coated on the tip part of the optical fiber 30 in the ferrule 20c at the side facing the lens (optical member) 102. Although coating the phosphor 70 is sufficient, the frame body 80 which surrounds the periphery of the phosphor 70 may be provided, and the wall on the inner-diameter side of the frame body 80 may be provided with the reflecting surface 81 similarly to the above embodiment to allow light to more efficiently enter the inside of the optical fiber 30. Further, the reflective filter 90 may cover the frame body 80. All the configurations enable light wavelength-converted by the phosphor 70 to more efficiently enter the inside of the optical fiber 30.

Although, in FIG. 20, the lens 102 is used to concentrate light emitted from the laser light source 101 onto the optical fiber 30a incorporated in the ferrule 20a, the present invention is not particularly limited thereto. It is needless to say that the reflecting mirror 111 illustrated in FIG. 17 may be used, or the plurality of lenses 102, 110 and the reflecting mirror 111 may be used as illustrated in FIG. 18.

Further, phosphors 70 may be disposed in a dispersed manner inside the optical fiber 30a instead of providing the frame body 80. In this case, the reflective filter 90 covers the entrance end of the optical fiber 30a instead of being disposed between the optical fiber 30 and the optical fiber 30a.

As described above, the second embodiment makes it possible to allow light having one or a plurality of wavelengths emitted from the laser light source 101 to enter the inside of the optical fiber 30 through the phosphor 70 which is coated on the tip part of the optical fiber 30 at the side facing the optical member. Thus, even when light is wavelength-converted and diffused by the phosphor 70, it is possible to reliably concentrate the light to allow the light to efficiently enter the inside of the optical fiber 30. Therefore, it is possible to measure the thickness and the distance of a measurement object with high accuracy.

The present invention is not limited to the above embodiments, and various modifications and improvements can be made within the scope of the invention. For example, the optical member is not limited to ones disclosed in the above first and second embodiments, and a concave lens and a reflecting mirror (reflector) may be combined in addition to a convex lens. The kind, ratio, and coating of a phosphor material used as the phosphor may be embodied using an appropriate combination and ratio according to the optical characteristics.

The multi-wavelength photoelectric measurement device of the present invention can be suitably used as multi-wavelength photoelectric devices such as a confocal displacement meter, an interference displacement meter, and a color optical sensor capable of measuring the characteristic amount of a measurement object such as the thickness, distance, displacement, or color using multi-wavelength light such as white light.

What is claimed is:

1. A confocal measurement device comprising:
   a laser light source configured to emit a laser light;
   a phosphor optically coupled to the laser light source, and configured to be excited by the laser light to emit a multi-wavelength light;
   a light source optical condenser disposed on an optical path of the laser light, and configured to concentrate the laser light toward the phosphor;
   an optical fiber unit having a splitter, at least one optical fiber comprising three optical fiber portions having a first end, a second end and a third end, the first end optically coupled to the phosphor, the second end optically connected to the first end through the splitter, and the third end optically connected to the second end through the splitter, wherein the optical fiber unit is configured to receive the multi-wavelength light emitted by the phosphor from the first end, to guide the multi-wavelength light from the first end to the second end, and to guide a measurement light from the second end toward the third end through the splitter;
   a head optical condenser including a chromatic aberration lens, configured to concentrate the multi-wavelength light emitted from the second end of the optical fiber unit toward a measurement object, a focal length of the multi-wavelength light depending on the wavelength of each of the multi-wavelength light by passing through the chromatic aberration lens, and to concentrate, as the measurement light, a reflected light from the measurement object toward the second end of the optical fiber unit;

a light receiving element that selectively receives the measurement light passing through the third end of the optical fiber unit from the measurement object according to wavelength using a spectroscope and photoelectrically converts the measurement light to a signal corresponding to a light receiving amount; and a measurement controller that measures thickness or displacement of the measurement object on the basis of the signal indicating the light receiving amount corresponding to the wavelength from the light receiving element.

2. The confocal measurement device according to claim 1, wherein the phosphor is fixed within a light transmissive medium that transmits the laser light from the laser light source and the multi-wavelength light emitted by the phosphor, and the light transmissive medium is fixed to the first end of the optical fiber unit.

3. The confocal measurement device according to claim 1, further comprising an optical filter disposed between the phosphor and the light source optical condenser, and configured to transmit the laser light from the laser light source and to reflect the multi-wavelength light emitted by the phosphor.

4. The confocal measurement device according to claim 1, further comprising a frame body that includes an opening having a shape corresponding to an optical path of light incident on the first end of the optical fiber unit and houses the phosphor in the opening.

5. The confocal measurement device according to claim 4, further comprising a reflecting surface formed on a wall on an inner-diameter side of the frame body.

6. The confocal measurement device according to claim 1, further comprising:
a frame body that includes an opening having a shape corresponding to an optical path of light incident on the first end of the optical fiber unit and houses the phosphor in the opening; and
an optical filter configured to cover the frame body at a side facing the light source optical condenser, to transmit the laser light from the laser light source, and to reflect the multi-wavelength light emitted by the phosphor.

7. The confocal measurement device according to claim 1, further comprising a frame body that includes an opening having a shape corresponding to an optical path of light incident on the first end of the optical fiber unit and houses the phosphor in the opening, wherein
the phosphor is fixed within a light transmissive medium that transmits the laser light from the laser light source and the multi-wavelength light emitted by the phosphor, and
the phosphor and the light transmissive medium are housed in the opening of the frame body.

8. The confocal measurement device according to claim 1, further comprising:
a frame body that includes an opening having a shape corresponding to an optical path of light incident on the first end of the optical fiber unit and houses the phosphor in the opening; and an optical filter configured to cover the frame body at a side facing the light source optical condenser, to transmit the laser light from the laser light source, and to reflect the multi-wavelength light emitted by the phosphor, wherein
the phosphor is fixed inside a light transmissive medium that transmits the laser light from the laser light source and the multi-wavelength light emitted by the phosphor, and
the phosphor and the light transmissive medium are housed in the opening of the frame body.

9. The confocal measurement device according to claim 1, wherein the light source optical condenser includes one or a plurality of lenses.

10. The confocal multi measurement device according to claim 1, wherein the light source optical condenser includes a tubular reflecting mirror with a lens incorporated.

11. A confocal measurement device comprising:
a laser light source configured to emit a laser light;
a phosphor optically coupled to the laser light source, and configured to be excited by the laser light to emit a multi-wavelength light;
a light source optical condenser disposed on an optical path of the laser light, and configured to concentrate the laser light toward the phosphor;
a reflecting member having a reflecting surface supporting the phosphor and configured to reflect the multi-wavelength light on the reflecting surface;
an optical fiber unit having a splitter, at least one optical fiber comprising three optical fiber portions having a first end, a second end and a third end, the first end optically coupled to the phosphor, the second end optically connected to the first end through the splitter, and the third end optically connected to the second end through the splitter, wherein the optical fiber unit is configured to receive the multi-wavelength light emitted by the phosphor from the first end, to guide the multi-wavelength light from the first end to the second end, and to guide a measurement light from the second end toward the third end through the splitter
a head optical condenser including a chromatic aberration lens, configured to concentrate the multi-wavelength light emitted from the second end of the optical fiber unit toward a measurement object, a focal length of the multi-wavelength light depending on the wavelength of each of the multi-wavelength light by passing through the chromatic aberration lens, and to concentrate, as the measurement light, a reflected light from the measurement object toward the second end of the optical fiber unit;
a light receiving element that selectively receives the measurement light passing through the third end of the optical fiber unit from the measurement object according to wavelength using a spectroscope and photoelectrically converts the measurement light to a signal corresponding to a light receiving amount; and
a measurement controller that measures thickness or displacement of the measurement object on the basis of the signal indicating the light receiving amount corresponding to the wavelength from the light receiving element.

* * * * *